United States Patent
Saber et al.

(10) Patent No.: US 10,025,755 B2
(45) Date of Patent: Jul. 17, 2018

(54) DEVICE AND METHOD TO PROCESS DATA IN PARALLEL

(71) Applicant: SAMSUNG ELECTRONICS CO., LTD., Suwon-si (KR)

(72) Inventors: Moradi Saber, Suwon-si (KR); Jun Haeng Lee, Hwaseong-si (KR); Eric Hyunsurk Ryu, Hwaseong-si (KR); Keun Joo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 14/989,851

(22) Filed: Jan. 7, 2016

(65) Prior Publication Data

US 2017/0011006 A1 Jan. 12, 2017

(30) Foreign Application Priority Data

Jul. 6, 2015 (KR) .................. 10-2015-0095734

(51) Int. Cl.
*G06F 17/15* (2006.01)
*G06F 7/544* (2006.01)
*G06N 3/00* (2006.01)

(52) U.S. Cl.
CPC ............ *G06F 17/15* (2013.01); *G06F 7/5443* (2013.01); *G06F 17/153* (2013.01); *G06N 3/00* (2013.01)

(58) Field of Classification Search
CPC .......... G06T 1/20; G06F 17/15–17/153; G06F 7/5443

See application file for complete search history.

(56) References Cited

U.S. PATENT DOCUMENTS

| 4,062,060 | A | 12/1977 | Nussbaumer |
| 5,138,695 | A | 8/1992 | Means et al. |
| 5,949,920 | A * | 9/1999 | Jordan .................. G06F 17/153 382/205 |
| 7,663,651 | B2 | 2/2010 | Itoh et al. |
| 8,391,627 | B1 | 3/2013 | Worthington |
| 8,510,244 | B2 | 8/2013 | Carson et al. |
| 8,917,952 | B2 | 12/2014 | Yang |
| 2012/0303932 | A1 | 11/2012 | Farabet et al. |
| 2013/0251265 | A1 | 9/2013 | Chehaiber |

(Continued)

FOREIGN PATENT DOCUMENTS

JP 2014-203135 A 10/2014
KR 10-1061008 B1 9/2011

OTHER PUBLICATIONS

B. Bosi, G. Bois, Y. Savaria; "Reconfigurable pipelined 2D convolvers for fast digital signal processing", IEEE Transactions on VLSI Systems, vol. 7, No. 3, 1999.*

(Continued)

*Primary Examiner* — Matthew Sandifer
(74) *Attorney, Agent, or Firm* — Sughrue Mion, PLLC (57) ABSTRACT

A method and apparatus for processing data are provided. The processor includes an input buffer, a data extractor, a multiplier, and an adder. The input buffer receives data and stores the data. The data extractor extracts kernel data corresponding to a kernel in the data from the input buffer. The multiplier multiplies the extracted kernel data by a convolution coefficient. The adder calculates a sum of multiplication results from the multiplier.

18 Claims, 10 Drawing Sheets

(56) References Cited

U.S. PATENT DOCUMENTS

2014/0019727 A1    1/2014  Zhu et al.
2015/0178246 A1*   6/2015  Herrero
                           Abellanas ............. G06F 17/153
                                                          708/300

OTHER PUBLICATIONS

Hui Zhang, Mingxin Xia, and Guangshu Hu; "A multiwindow partial buffering scheme for FPGA-based 2-D convolvers", IEEE Transactions on Circuits and Systems II: Express Briefs, vol. 54, No. 2, Feb. 2007.*
S. Perri, M. Lanuzza, P. Corsonello, and G. Cocorullo: "A high-performance fully reconfigurable FPGA-based 2-D convolution processor," Microprocessors and Microsystems, vol. 29, 2005.*
Benedetti, A. Prati, N. Scarabottolo, Image convolution on FPGAs: the implementation of a multi-FPGA FIFO structure, Proceedings of the 24th Euromicro Conference, Vesteras, Sweden, 1998.*
Pham, et al.; "NeuFlow: Dataflow Vision Processing System-on-a-Chip", IEEE, Aug. 2012, 4 pages total.
Sankaradas, et al.; "A Massively Parallel Coprocessor for Convolutional Neural Networks", 20th IEEE International Conference on Application-Specific Systems, Architectures and Processors, Jul. 2009, 8 pages total.

* cited by examiner

DEVICE AND METHOD TO PROCESS DATA IN PARALLEL

CROSS-REFERENCE TO RELATED APPLICATION

This application claims priority from Korean Patent Application No. 10-2015-0095734, filed on Jul. 6, 2015, in the Korean Intellectual Property Office, the disclosure of which is incorporated by reference herein in its entirety.

BACKGROUND

1. Field

Apparatuses and methods consistent with exemplary embodiments relate to processing data in parallel.

2. Description of the Related Art

Machine learning techniques may be applied to a field of, for example, text recognition, image recognition, and voice recognition. In particular, such techniques may be implemented based on a neural network. The neural network may be involved with an algorithm based on a concept of interconnected neurons, and the neurons may be grouped into layers.

As an example of the neural network, convolutional filtering may be performed in a convolutional neural network (CNN).

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a processor comprising an input buffer configured to receive data and store the data; a data extractor configured to extract kernel data corresponding to a kernel in the data from the input buffer; a multiplier configured to multiply the extracted kernel data by a convolution coefficient; and an adder configured to calculate a sum of multiplication results from the multiplier.

The kernel may comprise a plurality of kernels, and the data extractor may be configured to simultaneously extract in parallel kernel data corresponding to each of the kernels from the data, and provide the extracted kernel data to the multiplier.

The multiplier may be configured to simultaneously multiply in parallel the kernel data corresponding to each of the plurality of kernels by the convolution coefficient.

The adder may be configured to calculate a sum of the multiplication results for each of the kernels, and output a convolution result value for each of the kernels.

The input buffer may comprise a plurality of buffers, each sequentially connected to one another, and wherein each of the buffers is configured to transfer a value stored in a corresponding buffer to a subsequent buffer, receive a value stored in a previous buffer, and store the received value.

The data may be data associated with an image having a width of W pixels, a size of the kernel is K, and a number of kernels may be N, each of W, K, and N being an integer greater than or equal to 1, and wherein the input buffer comprises $(K+N-1)*W$ buffers.

The data extractor may be configured to form an electrical connection to a buffer corresponding to the kernel in the input buffer to receive kernel data corresponding to the kernel, and wherein the data extractor may be configured to form an electrical connection to the multiplier and transfer the kernel data to the multiplier.

The data extractor may comprise a matrix switch configured to form electrical connections to the input buffer, the multiplier, and the adder based on the kernel.

The multiplier may be an array multiplier having a plurality of multipliers arranged in a form of a two-dimensional array.

The adder may comprise a plurality of adders arranged based on binary tree architecture to sequentially add a result of applying the convolution coefficient to the kernel data corresponding to the kernel.

The processor may be configured to provide an output of the adder to a main processor.

The data extractor may be configured to, in response to a change in a kernel, extract kernel data corresponding to a changed kernel from the data and provide the extracted kernel data to the multiplier.

According to another aspect of an exemplary embodiment, there is provided a method of processing data, the method comprising receiving data and storing the received data in an input buffer; extracting kernel data corresponding to a kernel in the data from the input buffer; multiplying the extracted kernel data by a convolution coefficient; and calculating a sum of multiplication results from the multiplying the extracted kernel data by the convolution coefficient.

The kernel may comprise a plurality of kernels, and the extracting may comprise simultaneously extracting in parallel kernel data corresponding to each of the kernels.

The multiplying may comprise simultaneously multiplying in parallel the kernel data corresponding to each of the kernels by the convolution coefficient.

The calculating may comprise calculating a sum of the multiplication results for each of the kernels and outputting a convolution result value for each of the kernels.

The extracting may comprise forming an electrical connection to a buffer corresponding to the kernel of the input buffer and receiving the kernel data corresponding to the kernel; and forming an electrical connection to a multiplier and transferring the kernel data to the multiplier.

According to another aspect of an exemplary embodiment, there is provided a processor configured to receive an input image having a width of W pixels and a height of H pixels; and when a number of kernels is N and a kernel has a size of K, perform convolutional filtering during $(W-K)*K*(H-K)/2$ cycles, wherein each of W, H, K, and N is an integer greater than or equal to 1.

According to another aspect of an exemplary embodiment, there is provided a processor comprising an input buffer configured to receive data and store the data; a data extractor configured to simultaneously extract in parallel first kernel data corresponding a first kernel and second kernel data corresponding to a second kernel from the data stored in the input buffer; a multiplier configured to simultaneously multiply in parallel the extracted first kernel data by a first convolution coefficient, and the extracted second kernel data by a second convolution coefficient; and an adder configured to calculate a sum of the multiplication results for the first kernel and a sum of the multiplication results for the second kernel, and output the sums for each of the first kernel and the second kernel.

The processor may omit storing an intermediate calculation result.

BRIEF DESCRIPTION OF THE DRAWINGS

The above and other aspects will become apparent and more readily appreciated from the following detailed description of certain exemplary embodiments, taken in conjunction with the accompanying drawings of which.

DETAILED DESCRIPTION

Hereinafter, exemplary embodiments will be described in detail with reference to the accompanying drawings, wherein like reference numerals refer to like elements throughout.

Various alterations and modifications may be made to the exemplary embodiments, some of which will be illustrated in detail in the drawings and detailed description. However, it should be understood that these exemplary embodiments are not to be construed as limited to the illustrated forms and include all changes, equivalents or alternatives within the idea and the technical scope of this disclosure.

The terminology used herein is for the purpose of describing particular exemplary embodiments only and is not intended to be limiting of the disclosure. As used herein, the singular forms "a," "an" and "the" are intended to include the plural forms as well, unless the context clearly indicates otherwise. It will be further understood that the terms "comprise", "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Like reference numerals in the drawings denote like elements, and redundant descriptions of like elements will be omitted herein. When it is determined that a detailed description of a related known function or configuration may make the purpose of the present disclosure unnecessarily ambiguous in describing the present disclosure, the detailed description will be omitted herein.

Figure 1:
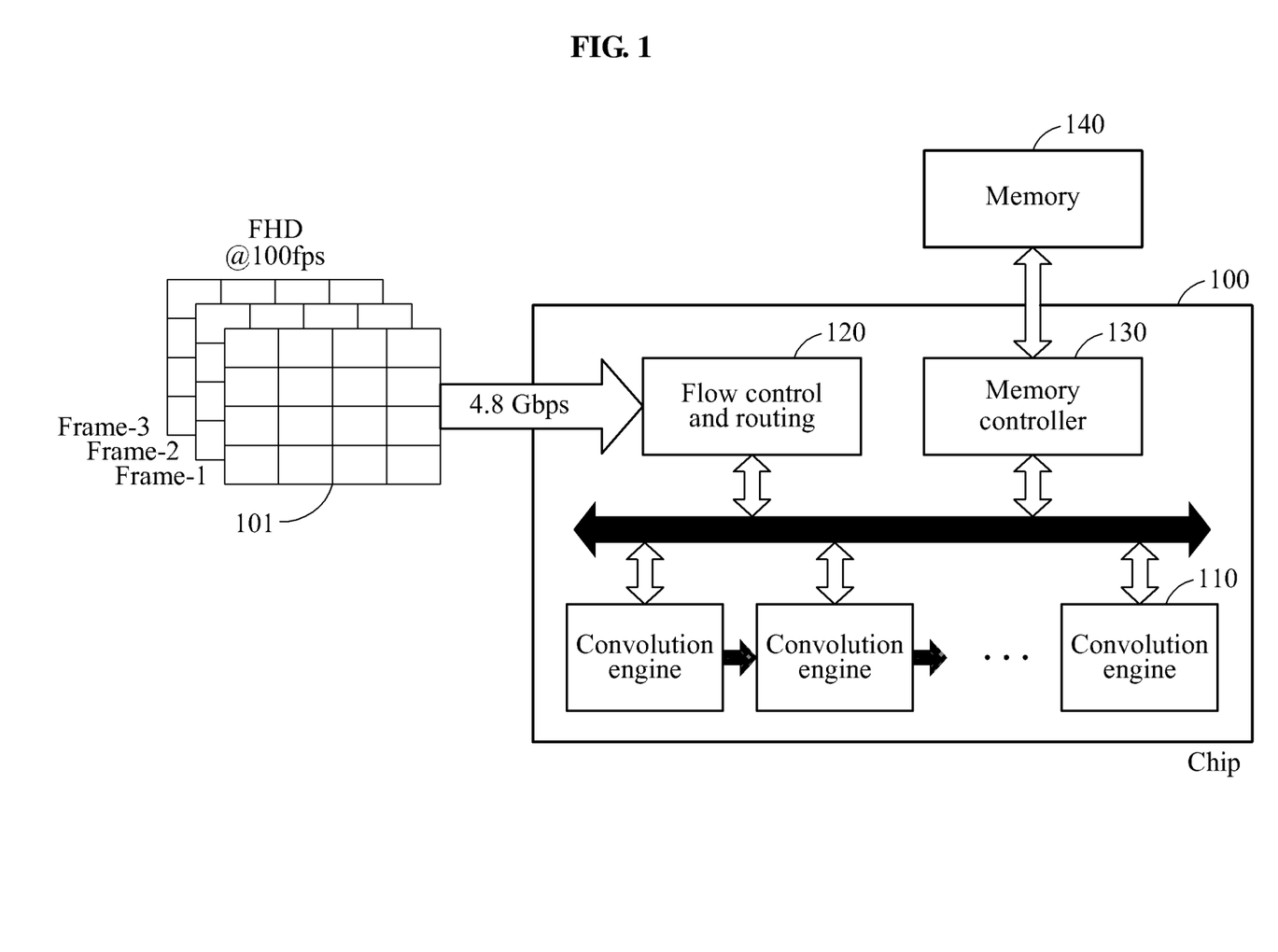
FIG. 1 illustrates an example of a chip according to an exemplary embodiment.

FIG. 1 illustrates a chip 100 according to an exemplary embodiment.

The chip 100 may provide input data 101 to a convolution engine 110 through a flow control and routing 120. A memory controller 130 may manage data transmitted between a memory 140 and the convolution engine 110.

The input data 101 may be data, for example, image data and/or voice data, input to the chip 100. The input data 101 may be sequentially input to the chip 100 in a form of, for example, a sequence. In FIG. 1, the input data 101 may be data associated with a full high definition (FHD) image. Also, the input data 101 may be received and input to the chip 100 at data rates of 100 frames per second (FPS) and 4.8 gigabytes per second (Gbps), respectively. The aforementioned type of input data, definition, FPS, data rates, and the like illustrated in FIG. 1 are described as an example and thus, may vary depending on an implementation.

The convolution engine 110 may indicate a hardware device performing convolutional filtering. In an example, the convolution engine 110 may be a co-processor for assisting a main processor. Hereinafter, in the present disclosure, the convolution engine may correspond to a processor for processing input data. Although FIG. 1 illustrates that a plurality of convolution engines including the convolution engine 110 is used in parallel as an example, the disclosure is not limited thereto. Depending on an example, a single convolution engine, for example, the convolution engine 110 may be used continuously. Descriptions related to the convolutional filtering will be provided with reference to FIG. 2.

An access of the memory 140 may be allowed by the convolution engine 110 under a control of the memory controller 130, and the memory 140 may store a convolution result value of the convolution engine 110. The memory 140 may include, for example, a wide input/output (I/O) mobile dynamic random access memory (DRAM) to which through-silicon via technology (TSV) is applied. The wide I/O mobile DRAM may be a memory having a mobile system-on-chip (SoC) on which a DRAM is stacked using three-dimensional (3D) die stacking technology. The DRAM may be a type of random access memory (RAM), and indicate a memory device for storing each bit of information in an individual capacitor.

Figure 2:
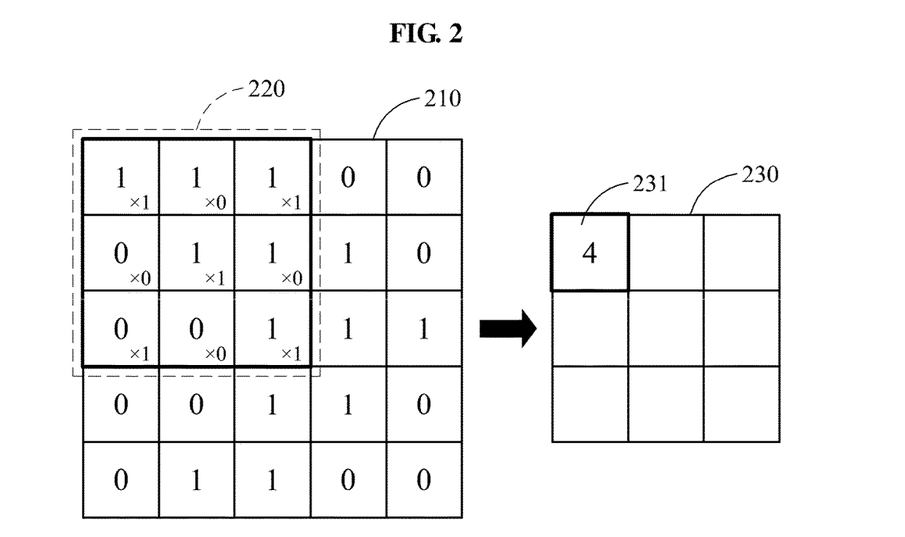
FIG. 2 illustrates an example of convolutional filtering according to an exemplary embodiment.

FIG. 2 illustrates an example of convolutional filtering according to an exemplary embodiment.

The convolutional filtering may indicate an operation of adding a sum of multiplication results of input data and convolution coefficients corresponding to elements of each convolution mask provided in a form of matrix. Hereinafter, the convolutional mask may also be referred to as, for example, a kernel 220.

As an example, in the convolutional filtering, multiplication of a value corresponding to a current pixel in input data and a value corresponding to a center of the kernel 220 may be performed, and multiplications of other values of the kernels 220 and values corresponding to the other values in the input data may be performed. In this example, a sum of results of the multiplications may be an output of the convolutional filtering. When the input data is expressed by an input frame 210 as image data, the kernel 220 may move in a direction based on a number of pixel units. The direction may be predetermined, and the number of pixel units may also be predetermined. Through this, a sum of multiplication results between pixels of the input frame 210 and the kernel 220 may be output as a convolution result value.

In FIG. 2, the input data may be the image data and provided in a form of a frame. The input data may be assumed as an input frame 210 of, for example, 5×5 pixels.

In FIG. 2, the kernel 220 may include a matrix having convolution coefficients, for example.

$$\begin{bmatrix} 1 & 0 & 1 \\ 0 & 1 & 0 \\ 1 & 0 & 1 \end{bmatrix}.$$

An output frame 230 shown in FIG. 2 may include a result of performing convolutional filtering on a pixel at a position separated by one cell rightward and one cell downward from a leftmost top end. As illustrated in FIG. 2, a value of the leftmost top end of the output frame 230 may be output as a convolutional filtering result value 231 and calculated to be, for example, (1×1)+(1×0)+(1×1)+(0×0)+(1×1)+(1×0)+(0×1)+(0×0)+(1×1)=4.

Although FIG. 2 illustrates the convolutional filtering result value 231 provided for one pixel, convolutional filtering results may be output with respect to all pixels of the input frame 210 when the kernel 220 moves in a direction, for example, in a right direction on a row and moves to a first column of a subsequent row after the convolutional filtering is performed on a last column of the row. The disclosure is not limited thereto, and thus the convolution filtering may be performed on a portion of pixels. That is, convolution filtering may alternatively be performed on only a portion of the pixels of the input frame 210.

Figure 3:
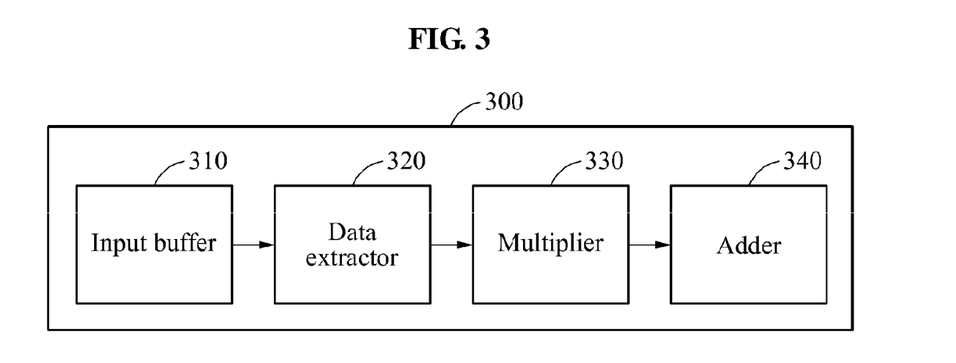
FIG. 3 is a block diagram illustrating an example of a processor according to an exemplary embodiment.

FIG. 3 is a block diagram illustrating a processor 300 according to an exemplary embodiment.

The processor 300 may include an input buffer 310, a data extractor 320, a multiplier 330, and an adder 340. The processor 300 may be a co-processor configured to support a main processor, and may provide a result of performing convolutional filtering on input data to, for example, the main processor and a memory. As an example, the processor 300 may perform the convolutional filtering on an image processing device, for example, a smartphone, a personal computer (PC), a home appliance, and an autonomous vehicle, employing a neural network. That is, the processor 300 may be included in the image processing device, such as a smartphone, a PC, a home appliance, and an autonomous vehicle.

The input buffer 310 may sequentially receive input data and store the received input data. The input data may be, for example, image data and/or voice data. In the present disclosure, descriptions will be provided based on the image data as an example. The input buffer 310 may include a plurality of buffers and may be, for example, a shift register. However, a structure of the input buffer is not limited thereto. Descriptions related to an operation of the input buffer 310 will be provided with reference to FIG. 5.

The data extractor 320 may extract kernel data corresponding to a kernel of the input data from the input buffer 310. In response to a change in the kernel, the data extractor 320 may extract kernel data corresponding to a changed kernel data from the input data and provide the kernel data to the multiplier 330. As an example, in response to a change in a size of kernel used for the convolutional filtering, the data extractor 320 may extract kernel data corresponding to a changed kernel. The data extractor 320 may provide the extracted kernel data to the multiplier 330. For example, the data extractor 320 may selectively form an electrical connection such that the input data is extracted from a buffer determined as corresponding to the kernel in the input buffer 310. The kernel data may indicate, for example, data on which the convolutional filtering is to be performed during a current cycle in the input data. Descriptions related to the kernel data will be provided with reference to FIG. 4.

A cycle may be a time interval in which a processor performs an operation. Also, the cycle may indicate, for example, a period of time during which the processor performs an overall operation of generating output data based on the input data.

The multiplier 330 may multiply the extracted kernel data by a convolution coefficient. As an example, the multiplier 330 may output a multiplication result by multiplying each item of the kernel data extracted in the current cycle by the convolution coefficient included in the kernel, and provide the multiplication result to the adder 340 through the data extractor 320. The convolution coefficient used in the multiplier 330 may be changed based on convolution filtering to be performed.

The adder 340 may calculate a sum of multiplication results of the extracted kernel data and the convolution coefficient. The adder 340 may provide the sum, for example an output of the adder 340, to the main processor, the memory, and the like. Since the adder 340 calculates the sum for each kernel, a number of outputs corresponding to a number of kernels may be generated.

The processor 300 may be used in an image processing application performed based on high computational power. Also, the processor 300 may be used to, for example, function as a security camera and perform image pattern identification and scene parsing, in the smartphone, the autonomous vehicle, the home appliance, and the like.

The processor 300 may be a device for efficiently using hardware resources and acquiring a higher throughput in a convolutional operation. In contrast to related arts, the processor 300 may process the input data in parallel using the plurality of kernels, thereby avoiding an unnecessary routing operation and reducing memory requirements.

Figure 4:
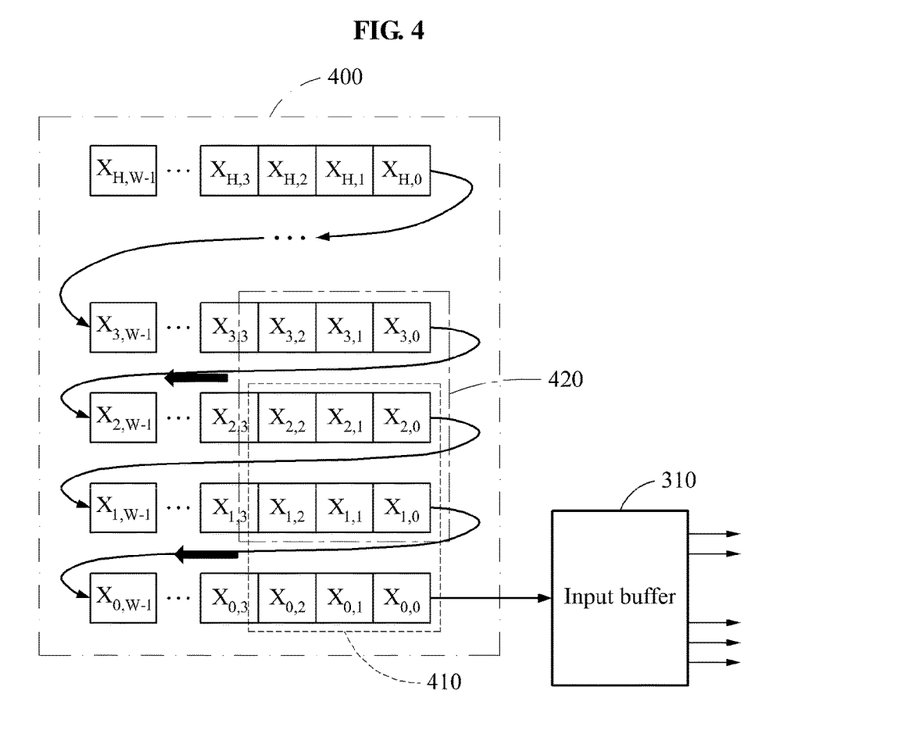
FIG. 4 illustrates an example of input data according to an exemplary embodiment.

FIG. 4 illustrates input data 400 according to an exemplary embodiment.

In FIG. 4, the input data 400 may be image data having a width corresponding to W pixels and a height corresponding to H pixels, W and H being an integer greater than or equal to 1.

As illustrated in FIG. 4, each pixel of the input data 400 may be sequentially input to the input buffer 310. For example, when the input buffer 310 receives $X_{0,0}$ in a first cycle, the input buffer 310 may receive $X_{0,1}$ in a subsequent cycle.

A plurality of kernels may be provided in parallel. Although FIG. 4 illustrates two 3×3 kernels, for example, a first kernel 410 and a second kernel 420, a size and the number of kernels are not limited thereto. Thus, the size and the number of kernels may vary depending on a configuration and a process.

Kernel data may be data output from a buffer determined as corresponding to the kernel in the input buffer 310. In the buffer, the kernel data may be extracted by a data extractor in each cycle similarly to the kernel moving in a direction, for example, in a left direction, as illustrated by the two dark arrows in FIG. 4. The foregoing example may be based on a case in which the input buffer 310 sequentially receives and stores the input data 400 such that a buffer among the plurality of buffers receives a value from a previously connected buffer and transmits a value stored in the buffer to a subsequent buffer.

As an example, in FIG. 4, kernel data corresponding to the first kernel 410 in a first cycle may be $X_{0,0}$, $X_{0,1}$, $X_{0,2}$, $X_{1,0}$, $X_{1,1}$, $X_{1,2}$, $X_{2,0}$, $X_{2,1}$, and $X_{2,2}$, and kernel data corresponding to the first kernel 410 in a subsequent cycle may be $X_{0,1}$, $X_{0,2}$, $X_{0,3}$, $X_{1,1}$, $X_{1,2}$, $X_{1,3}$, $X_{2,1}$, $X_{2,2}$, and $X_{2,3}$. Similarly to the kernel data corresponding to the first kernel 410, kernel data corresponding to the second kernel 420 in the first cycle may be $X_{1,0}$, $X_{1,1}$, $X_{1,2}$, $X_{2,0}$, $X_{2,1}$, $X_{2,2}$, $X_{3,0}$, $X_{3,1}$, and $X_{3,2}$, and kernel data corresponding to the second kernel 420 in the subsequent cycle may be $X_{1,1}$, $X_{1,2}$, $X_{1,3}$, $X_{2,1}$, $X_{2,2}$, $X_{2,3}$, $X_{3,1}$, $X_{3,2}$, and $X_{3,3}$.

Although FIG. 4 illustrates the second kernel 420 disposed on a row higher than that of the first kernel 410 by one pixel, an arrangement of the kernels is not limited thereto. Thus, the arrangement of the kernels may vary depending on an implementation of the input buffer 310. Additionally, a moving direction of the kernel may vary based on, for example, the arrangement of the kernels. Thus, while the kernels move in a left direction in the example shown in FIG. 4, this is only an example and the kernels may move in other directions. Also, although the aforementioned descriptions are provided based on an example in which each of the kernels moves on a pixel-by-pixel basis to perform the convolutional filtering, the disclosure is not limited thereto. Thus, the number of slots by which the kernel moves for each cycle may also vary based on an implementation of the input buffer 310. In other words, the number of pixels by which the kernel moves for each cycle may be two or more rather than one pixel as shown in the example of FIG. 4.

Figure 5:
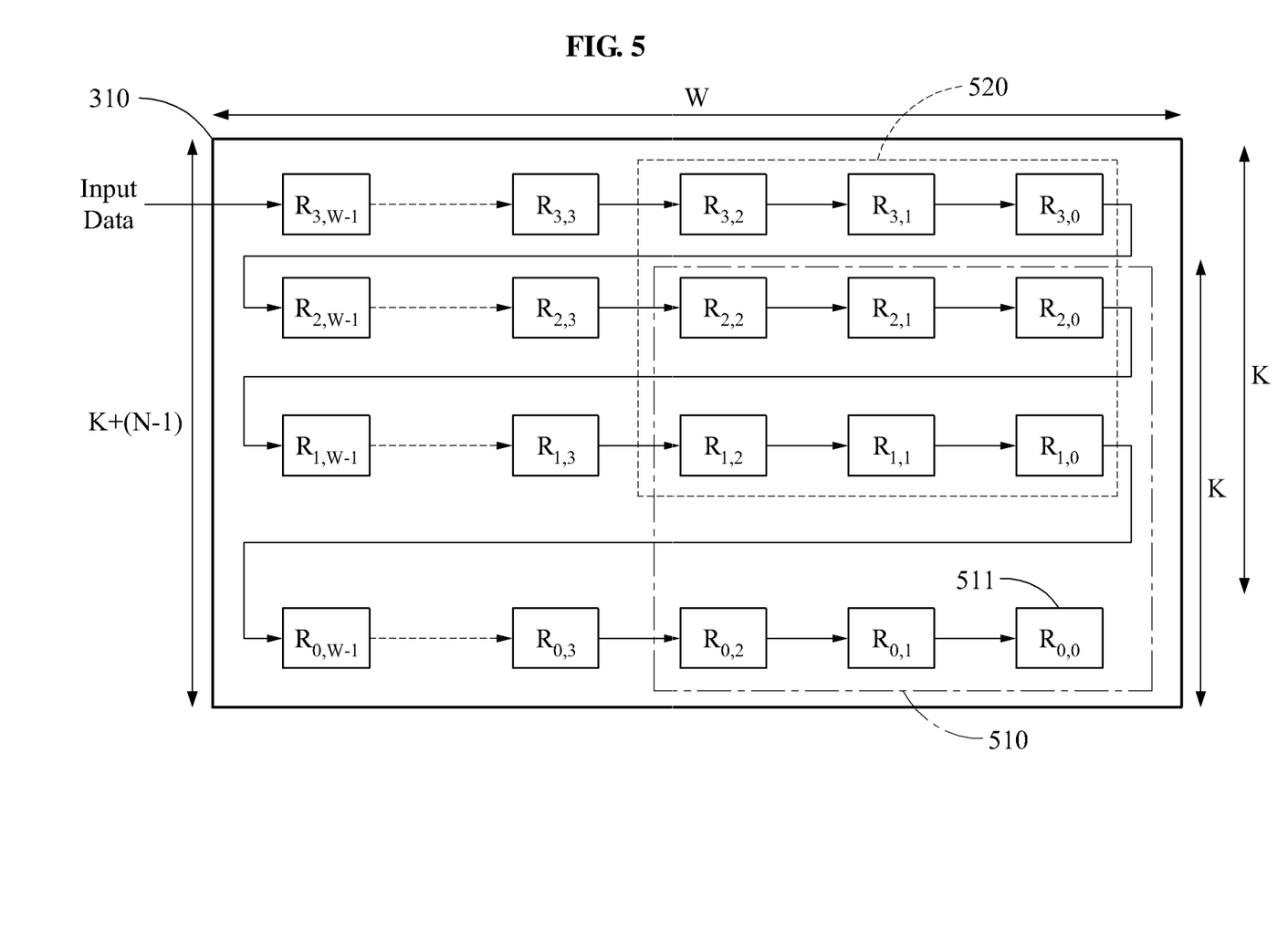
FIG. 5 illustrates an example of an input buffer according to an exemplary embodiment.

FIG. 5 illustrates an example of an input buffer according to an exemplary embodiment.

The input buffer 310 may include a plurality of buffers, each sequentially connected to one another. Each of the buffers may transfer a value to a subsequent buffer, receive a value stored in a previous buffer, and store the received value. The value that is transferred to a subsequent buffer may be prestored. The buffers may be, for example, shift registers.

In an example, input data may be data associated with an input image having a width corresponding to W pixels, a size of kernel may be K, and the number of kernels may be N, where W, K, and N are each an integer greater than or equal to 1. In this example, the input buffer 310 may include (K+N−1)×W buffers with reference to FIG. 5.

FIG. 5 illustrates a first kernel 510 and a second kernel 520 as an example in which, for example, N=2 and K=3. A data extractor may extract input data from a buffer determined for the first kernel 510 and a buffer determined for the second kernel 520. However, the size of kernel and the number of kernels are not limited thereto. Thus, a size and a number of kernels may vary based on an implementation or under a control of a processor while performing an operation. For example, under the control of the processor, each buffer may be determined as corresponding to a kernel or the determination may be revoked.

In an example, the input buffer 310 may operate as a first-in-first-out (FIFO) buffer. In FIG. 5, data associated with a first pixel, for example, $X_{0,0}$ of FIG. 4, in the input data may be stored in a register $R_{3,W-1}$. In a subsequent cycle of the first cycle, the register $R_{3,W-1}$ may transfer the data to a subsequent register, for example, a register $R_{3,W-2}$, receive data associated with a subsequent pixel, for example, $X_{0,1}$ of FIG. 4, and store the received data. After a plurality of cycles elapse, a register $R_{0,0}$ 511 may receive the data associated with the first pixel from a previous register, the register $R_{0,1}$ and store the received data. Also, in a subsequent cycle of the corresponding cycle, the register $R_{0,0}$ 511 may transmit the data associated with the first pixel, receive the data associated with the subsequent pixel, and store the received data.

Since the input buffer 310 stores the input data by incorporating K+N−1 FIFO units, the processor may not need to store an intermediate calculation result, for example, multiplication results obtained by applying a kernel to one pixel and a sum of partial multiplication results. Thus, the processor according to an exemplary embodiment may use a reduced silicon area when compared to a related art configuration of storing the intermediate calculation result. As an example, the related art configuration may use a relatively large buffer and a relatively small number of multiply-and-accumulate (MAC) units. In contrast, the processor according to an exemplary embodiment may use a smaller buffer when compared to the related art configuration. Thus, an overall silicon area may be reduced despite a slight increase in the number of MAC units.

Figure 6:
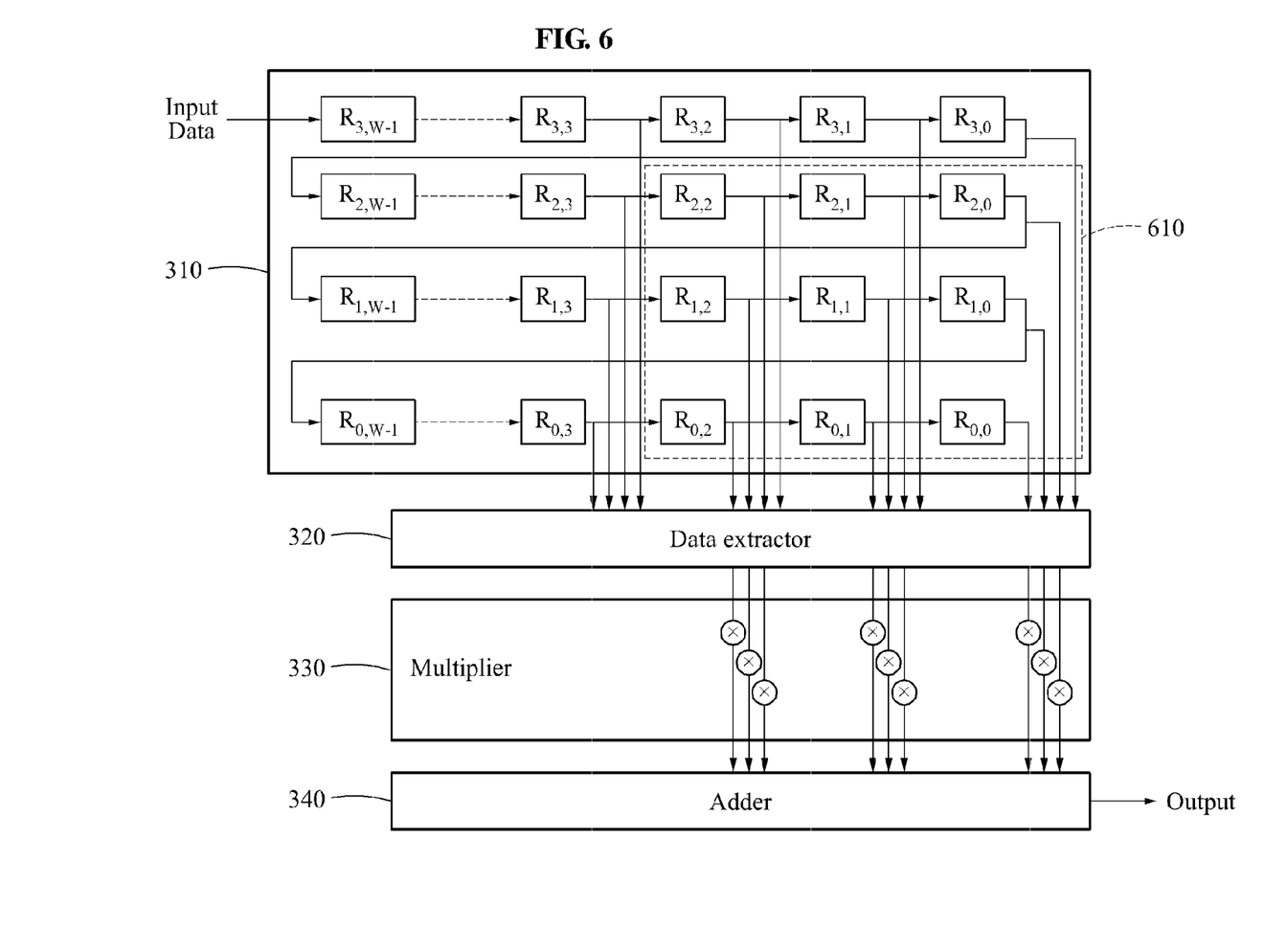
FIGS. 6 and 7 illustrate an example of a data extractor and an adder according to exemplary embodiments.
Figure 7:
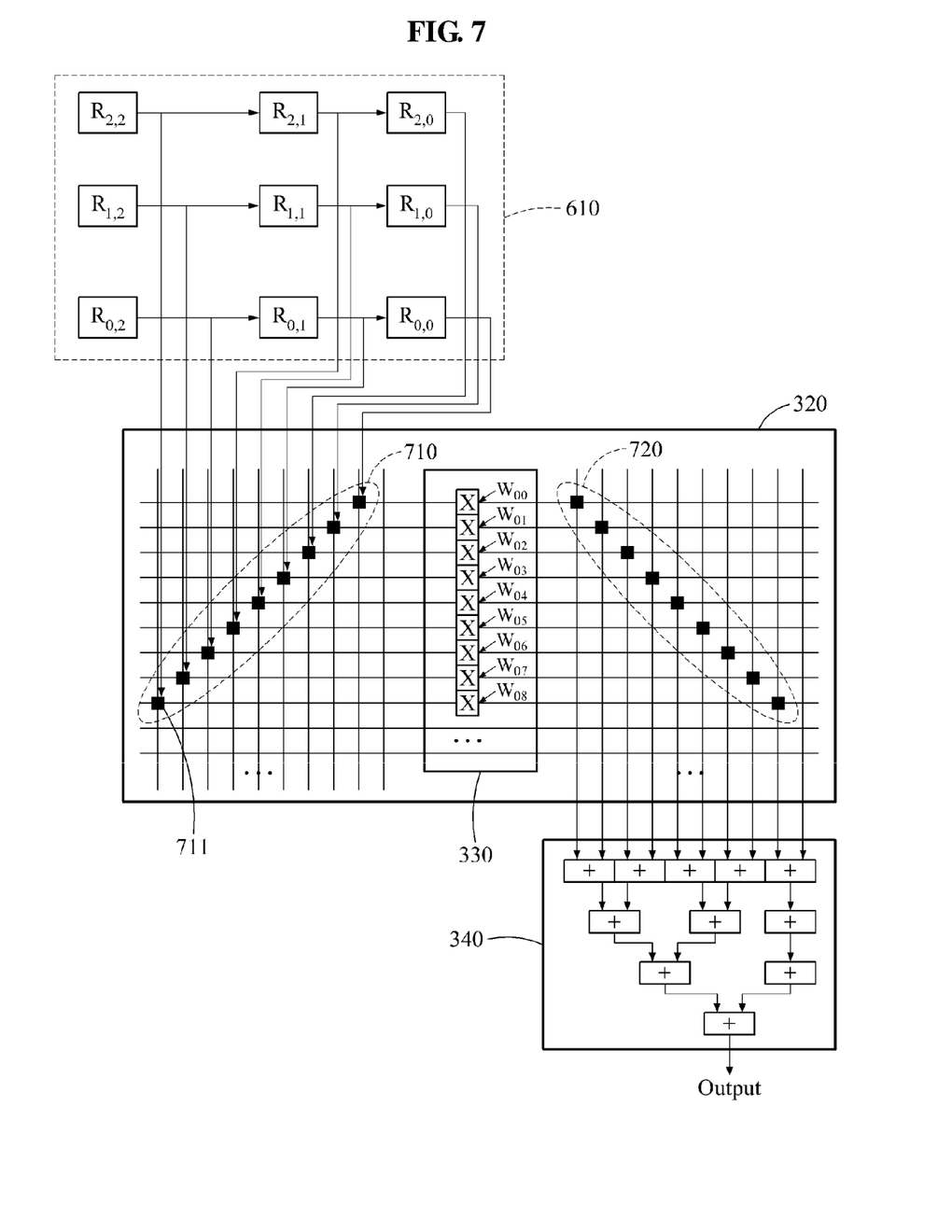

FIGS. 6 and 7 illustrate an example of a data extractor and an adder according to exemplary embodiments.

FIG. 6 illustrates an example in which the data extractor 320 extracts kernel data from the input buffer 310 when a single kernel, for example, a kernel 610 is provided. As an example, the data extractor 320 may form an electrical connection with a buffer corresponding to the kernel 610 in the input buffer 310 to receive kernel data corresponding to the kernel 610 from the buffer. Also, the data extractor 320 may form an electrical connection with the multiplier 330 to transfer the kernel data to the multiplier 330. Since the data extractor 320 forms the electrical connection with the multiplier 330 and each buffer determined as corresponding to the kernel 610 in the input buffer 310, a value stored in the buffer corresponding to the kernel 610 may be transferred to the multiplier 330. For example, the data extractor 320 may form the electrical connection such that buffers in the input buffer 310 are connected with a plurality of multipliers in parallel.

In FIG. 6, a size of the kernel 610 may be 3, for example, K=3, as shown. However, it will be understood that this is only an example, and the size of the kernel 610 may be more or less than K=3, as discussed above. An output of a buffer, for example, registers $R_{0,0}$, $R_{0,1}$, $R_{0,2}$, $R_{1,0}$, $R_{1,1}$, $R_{1,2}$, $R_{2,0}$, $R_{2,1}$, and $R_{2,2}$, corresponding to the kernel 610 having a size of 3×3 in the input buffer 310 may be transferred to the multiplier 330 through the electrical connection formed by the data extractor 320. The multiplier 330 may multiply each item of the kernel data by a convolution coefficient. The adder 340 may obtain a sum of outputs of the multiplier 330 and generate an output. Since the number of kernels is 1 in an example of FIG. 6, the adder 340 may output one output corresponding to the kernel 610.

FIG. 7 illustrates an example of the adder 340 and an electrical connection formed by the data extractor 320 to extract kernel data from an input buffer when a single kernel, for example, the kernel 610, is provided. In FIG. 7, a size of the kernel 610 may be 3, for example, K=3 as shown, and thus 9 (=3×3) buffers may be determined as corresponding to the kernel 610. However, it will be understood that this is only an example, and the size of the kernel 610 may be more or less than K=3, as discussed above.

The data extractor 320 may form an electrical connection 710 between the multiplier 330 and each buffer determined as corresponding to the kernel 610 in the input buffer. Also, the data extractor 320 may form the electrical connection between the input buffer and the multiplier 330, and form an electrical connection 720 between the multiplier 330 and the adder 340.

As an example, the data extractor 320 may include a matrix switch configured to form the electrical connections 710 and 720 among the input buffer, the multiplier 330, and the adder 340 based on the kernel 610. The matrix switch may short a switch connecting the multiplier 330 and a buffer in the input buffer to form an electrical connection, for example, an electrical connection 711 to a register $R_{2,2}$, and open the switch to disengage the electrical connection. However, the disclosure is not limited thereto, and thus the data extractor 320 may be implemented using, for example, a field-programmable gate array (FPGA).

Also, in response to a request for convolution filtering based on the kernel 610 having a differing size for each layer in a neural network, the data extractor 320 may selectively form the electrical connection and adaptively extract kernel data corresponding to the kernel 610 differing for each layer from the input data, thereby providing the kernel data to the multiplier 330. Switches included in the matrix switch may be adaptively controlled such that the electrical connection is formed with respect to, for example, a buffer corresponding to a kernel of which K=3 in response to a request for 3×3 convolution, a buffer corresponding to a kernel of which K=5 in response to a request for 5×5 convolution, a buffer corresponding to a kernel of which K=7 in response to a request for 7×7 convolution, and a buffer corresponding to a kernel of which K=11 in response to a request for 11×11 convolution. However, as discussed above, these sizes are only examples, and various different sizes may be provided.

The multiplier 330 may multiply the kernel data received through the electrical connection 710 formed by the data extractor 320 and a convolution coefficient, for example, $W_{00}$ through $W_{08}$, but is not limited thereto. In an example, when the kernel data received through the register $R_{0,0}$ is $X_{0,0}$, the multiplier 330 may multiply the kernel data $X_{0,0}$ by a convolution coefficient $W_{00}$ as illustrated in FIG. 7. Here, convolution coefficients may be predetermined, changed during a process, and/or may vary depending on an implementation. Similarly, the other convolution coefficients may be calculated for each item of kernel data received from the other buffers corresponding to the kernel 610. The multiplier 330 may be, for example, an array multiplier in which a plurality of multipliers is arranged in a form of 2D array. However, a type of the multiplier 330 is not limited thereto.

The adder 340 may calculate a sum of outputs received from the multiplier 330 through the electrical connection 720 formed by the data extractor 320. The adder 340 may include, for example, a plurality of adders arranged in a binary tree architecture for sequentially adding multiplication results obtained by applying the convolution coefficient to the kernel data corresponding to the kernel 610. A structure of the adder 340 is not limited to an example described with reference to FIG. 7 and thus, any structure for selectively adding the outputs of the multiplier 330 may be applicable thereto. Although FIG. 7 illustrates an example in which the single kernel, the kernel 610 is present and the adder 340 generates one output, the disclosure is not limited thereto. When N kernels are provided, the adder 340 may also generate an output, for example, N outputs, corresponding to each of the N kernels based on the number of kernels, N being an integer greater than 1.

Figure 8:
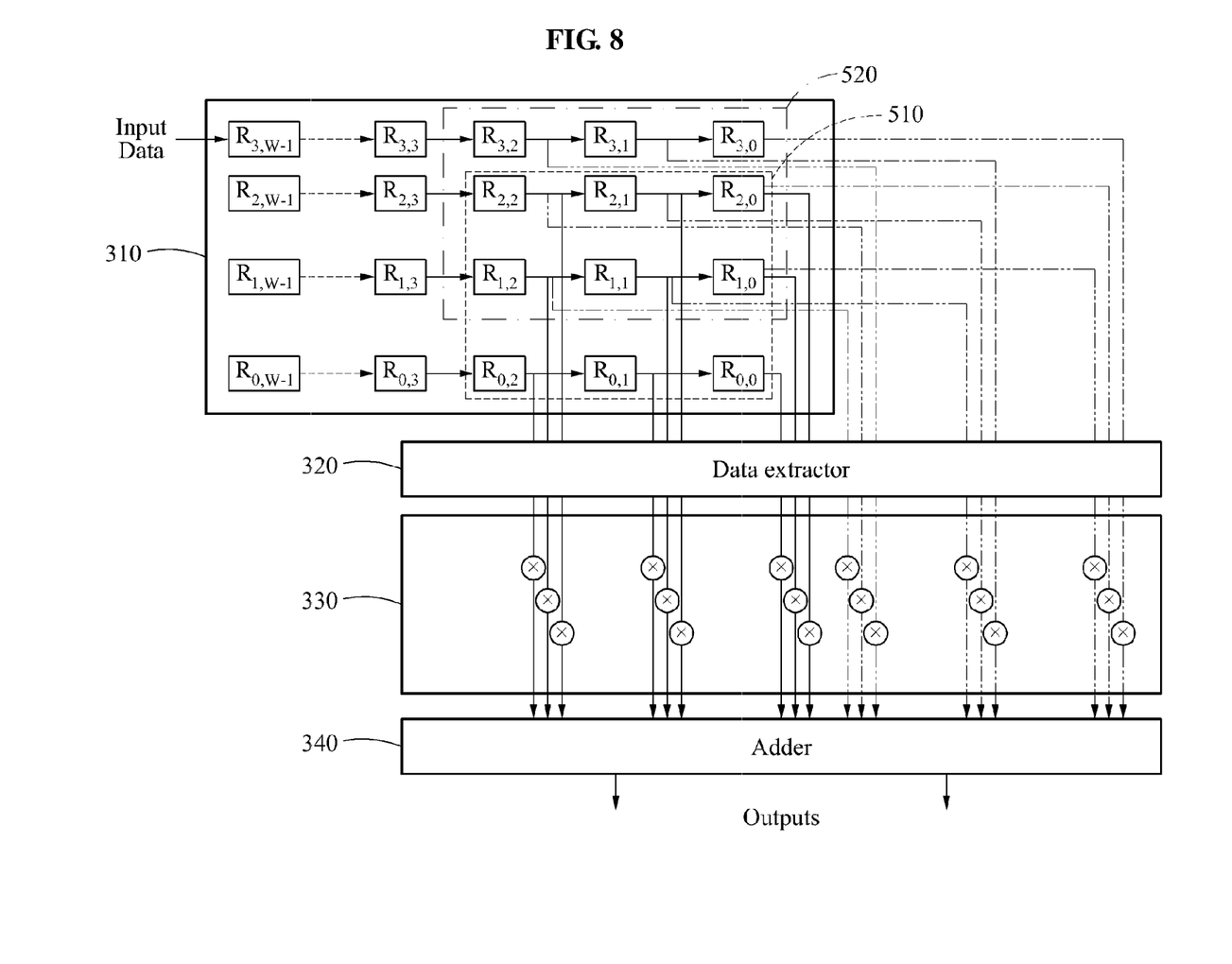
FIGS. 8 and 9 illustrate another example of a data extractor and an adder according to exemplary embodiments.
Figure 9:
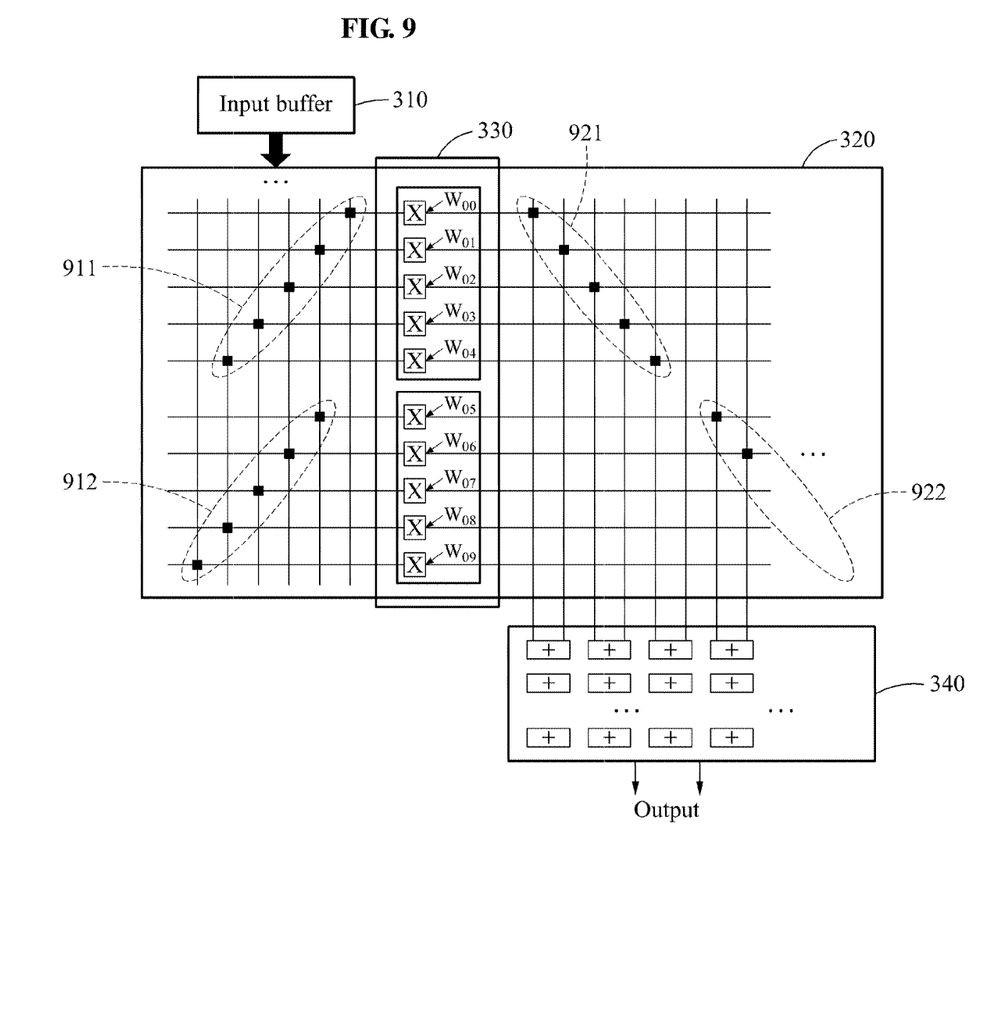

FIGS. 8 and 9 illustrate another example of a data extractor and an adder according to exemplary embodiments.

FIG. 8 illustrates an example in which the data extractor 320 extracts kernel data from the input buffer 310 when a plurality of kernels is provided. As an example, in FIG. 8, a first kernel 510 and a second kernel 520 may be used in a case in which the number kernels is 2, for example, N=2.

In an example, based on a plurality of kernels, the data extractor 320 may simultaneously extract kernel data corresponding to each of the kernels from input data in parallel, and provide the kernel data to the multiplier 330. In FIG. 8, the data extractor 320 may provide kernel data corresponding to the first kernel 510 and kernel data corresponding to the second kernel 520 to the multiplier 330 in the same cycle. In an example, the data extractor 320 may form an electrical connection between the multiplier 330 and a buffer determined as corresponding to each of the kernels in the input buffer 310 and thus, a value stored in the buffer corresponding to each of the kernels may be transferred to the multiplier 330. When a plurality of multipliers is provided, the data extractor 320 may identify kernel data corresponding to each of the kernels and transfer the identified kernel data to a corresponding multiplier. In FIG. 8, the adder 340 may generate an output corresponding to the first kernel 510 and an output corresponding to the second kernel 520.

In an example of FIG. 8, it is assumed that sizes of the first kernel 510 and the second kernel 520 may be 3, for example, K=3. When the data extractor 320 transfers an output of a buffer, for example, registers $R_{0,0}$, $R_{0,1}$, $R_{0,2}$, $R_{1,0}$, $R_{1,1}$, $R_{1,2}$, $R_{2,0}$, $R_{2,1}$, and $R_{2,2}$, corresponding to the first kernel 510 to the multiplier 330, the multiplier 330 may multiply each item of kernel data output from the buffer by a convolution coefficient. The adder 340 may calculate a sum of a result of the multiplying to generate the output corresponding to the first kernel 510. Also, when the data extractor 320 transfers an output of a buffer, for example, registers $R_{1,0}$, $R_{1,1}$, $R_{1,2}$, $R_{2,0}$, $R_{2,1}$, $R_{2,2}$, $R_{3,0}$, $R_{3,1}$, and $R_{3,2}$, corresponding to the second kernel 520 to the multiplier 330, the multiplier 330 may multiply each item of kernel data output from the buffer by the convolution coefficient. The adder 340 may calculate a sum of a result of the multiplying to generate the output corresponding to the second kernel 520.

The aforementioned operations may be simultaneously performed in parallel. For example, the adder 340 may generate the output corresponding to the first kernel 510 and the output corresponding to the second kernel 520 in the same cycle.

FIG. 9 illustrates an example of the adder 340 and an electrical connection formed by the data extractor 320 to extract kernel data from the input buffer 310 when two kernels are provided. FIG. 9 illustrates an electrical connection, a convolutional coefficient, and the like as an example and thus, may not include all contents for increased clarity and conciseness. In other words, only 5 electrical connections are shown for each kernel in FIG. 9 in order to increase clarity of description, but the number of electrical connections will vary depending on the size of the kernel used.

The data extractor 320 may form an electrical connection 911 between the multiplier 330 and each buffer determined as corresponding to a first kernel in the input buffer 310, and form an electrical connection 912 between the multiplier 330 and each buffer determined as corresponding to a second kernel in the input buffer 310. Also, the data extractor 320 may form an electrical connection 921 between the adder 340 and the multiplier 330 corresponding to the first kernel and an electrical connection 922 between the adder 340 and the multiplier 330 corresponding to the second kernel. For example, the data extractor 320 may selectively form electrical connections among the input buffer 310, the multiplier 330, and the adder 340 such that a convolutional result value of convolutional filtering performed on kernel data corresponding to each kernel is generated independently.

The multiplier 330 may include a plurality of multipliers. The multiplier 220 may receive the kernel data corresponding to the first kernel through the electrical connection 911 formed by the data extractor 320, and multiply the received kernel data by a convolution coefficient, for example, $W_{00}$, $W_{01}$, $W_{02}$, $W_{03}$, and $W_{04}$. Similarly, the multiplier 330 may multiply the kernel data corresponding to the second kernel by a convolution coefficient, for example, $W_{05}$, $W_{06}$, $W_{07}$, $W_{08}$, and $W_{09}$. The multiplier 330 may simultaneously multiply kernel data corresponding to each of a plurality of kernels by a convolution coefficient in parallel.

The adder 340 may generate a result value of convolutional filtering corresponding to each of the kernels through identification. That is, the adders 340 may generate a result value of convolutional filtering on a kernel-by-kernel basis. As an example, the adder 340 may calculate a sum of outputs of the multiplier 330 received through the electrical connection 921 corresponding to the first kernel, to output a convolutional filtering summation result corresponding to the first kernel. In this example, the convolutional filtering summation result may correspond to, for example, a convolutional result value. Also, the adder 340 may calculate a sum of outputs of the multiplier 330 received through the electrical connection 922 corresponding to the second kernel, to output a convolutional filtering summation result corresponding to the second kernel. Based on multiplication results obtained by applying the convolution coefficient to the kernel data corresponding to each of the kernels, the adder 340 may calculate a sum of the multiplication result for each of the kernels, thereby outputting the convolutional result value for each of the kernels. A structure of the adder 340 is not limited to an example illustrated in FIG. 9 and thus, any structure for selectively calculating a sum of multiplication results of multiplier 330 may be applicable thereto.

Figure 10:
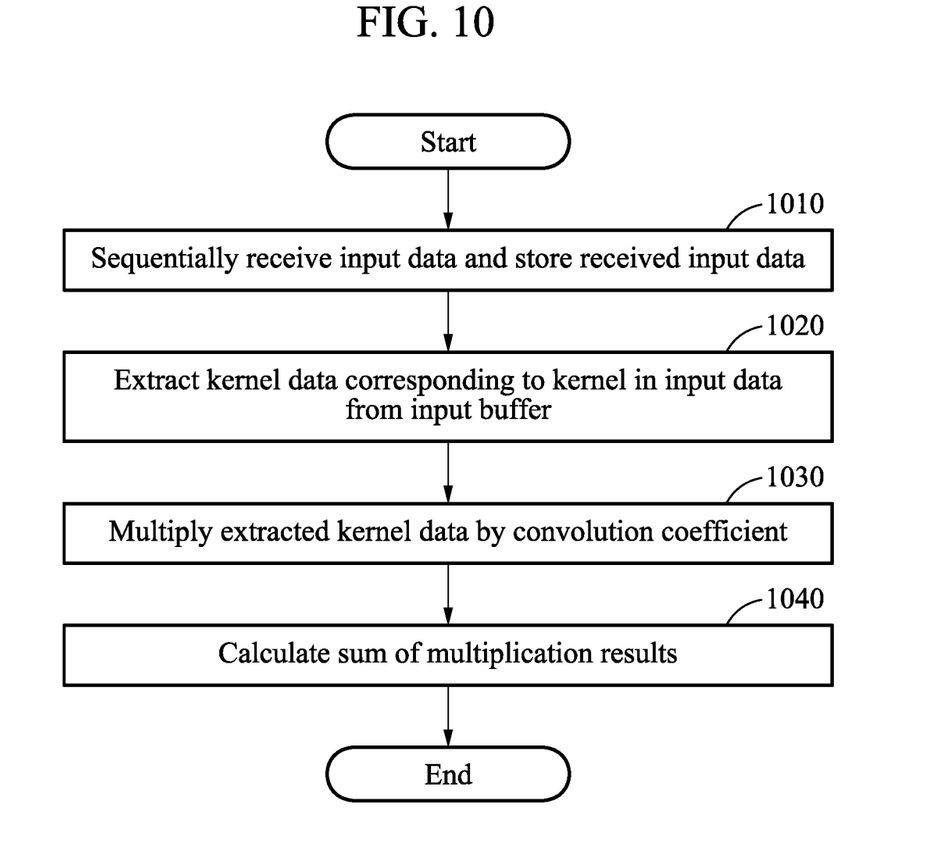
FIG. 10 is a flowchart illustrating a method of processing input data according to an exemplary embodiment.

FIG. 10 is a flowchart illustrating a method of processing input data according to an exemplary embodiment.

In operation 1010, an input buffer may sequentially receive input data and store the received input data.

In operation 1020, a data extractor may extract kernel data corresponding to a kernel in the input data from the input buffer. For example, based on a plurality of kernels, the data extractor may simultaneously extract kernel data corresponding to each of the kernels from the input data in parallel. In an example, as described with reference to FIGS. 7 and 9, the data extractor may selectively form an electrical connection with the input buffer, a multiplier, and an adder.

In operation 1030, the multiplier may multiply the extracted kernel data by a convolution coefficient. For example, the multiplier may simultaneously multiply the kernel data corresponding to each of the kernels by the convolution coefficient in parallel.

In operation 1040, the adder 1040 may calculate a sum of multiplication results. For example, based on multiplication results obtained by applying the convolution coefficient to the kernel data corresponding to each of the kernels, the adder may calculate a sum of the multiplication results for each of the kernels, thereby outputting a convolutional result value for each of the kernels.

A device for processing input data according to exemplary embodiments may not use, for example, a buffer and a cache, to store an intermediate calculation result. Additionally, the device may use one cycle and a period of time for loading input data to output the convolutional result value. Also, when the input data is an input frame related to an image and has a width of W and a height of H, and when the kernel has a size of K, the device may perform convolutional filtering during $(W-K)*K*(H-K)/2$ cycles.

The above-described exemplary embodiments may be recorded in non-transitory computer-readable media including program instructions to implement various operations which may be performed by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those skilled in the art that changes may be made to these exemplary embodiments without departing from the principles and spirit of the disclosure, the scope of which is defined by the claims and their equivalents.

What is claimed is:

1. A hardware processor comprising:
   an input buffer configured to receive data and store the data;
   a data extractor configured to extract kernel data comprising a plurality of data elements and corresponding to a kernel in the data from the input buffer;
   a plurality of multipliers configured to multiply the kernel data by convolution coefficients; and
   an adder configured to calculate a sum of multiplication results from the plurality of multipliers,
   wherein the data extractor comprises a matrix switch configured to form electrical connections to the input buffer, to the plurality of multipliers, and to the adder based on the kernel.

2. The hardware processor of claim 1, wherein the kernel comprises a plurality of kernels, and the data extractor is configured to simultaneously extract in parallel kernel data corresponding to each of the plurality of kernels from the data, and provide the kernel data that is extracted to the plurality of multipliers.

3. The hardware processor of claim 2, wherein the plurality of multipliers are configured to simultaneously multiply in parallel the kernel data corresponding to each of the plurality of kernels by the convolution coefficients.

4. The hardware processor of claim 2, wherein the adder is configured to calculate a sum of multiplication results for each of the plurality of kernels, and output a convolution result value for each of the plurality of kernels.

5. The hardware processor of claim 1, wherein the input buffer comprises a plurality of buffers, each sequentially connected to one another, and
   wherein each of the plurality of buffers is configured to transfer a first value stored in a corresponding buffer to a subsequent buffer, receive a second value stored in a previous buffer, and store the second value.

6. The hardware processor of claim 1, wherein the data is image data associated with an image having a width of W pixels, a size of the kernel is K, and a number of kernels is N, each of W, K, and N being an integer greater than or equal to 1, and wherein the input buffer comprises (K+N−1)*W buffers.

7. The hardware processor of claim 1, wherein the data extractor is configured to form a first electrical connection to a buffer corresponding to the kernel in the input buffer to receive the kernel data corresponding to the kernel, and wherein the data extractor is configured to form a second electrical connection to the multiplier and transfer the kernel data to the multiplier.

8. The hardware processor of claim 1, wherein the plurality of multipliers is an array multiplier having the plurality of multipliers arranged in a form of a two-dimensional array.

9. The hardware processor of claim 1, wherein the adder comprises a plurality of adders arranged based on a binary tree architecture to sequentially add a result of applying the convolution coefficients to the kernel data corresponding to the kernel.

10. The hardware processor of claim 1, wherein the hardware processor is configured to provide an output of the adder to a main processor.

11. The hardware processor of claim 1, wherein the data extractor is configured to, in response to a change from a first kernel to a second kernel, extract second kernel data corresponding to the second kernel from the data and provide the second kernel data to the plurality of multipliers.

12. A method performed by a hardware processor, the method comprising:

receiving, by the hardware processor, data and storing the data in an input buffer;

forming, by a matrix switch of the hardware processor, electrical connections to an input buffer, to a plurality of multipliers, and to an adder based on a kernel in the data from the input buffer, and extracting kernel data comprising a plurality of data elements corresponding to the kernel;

multiplying, by the plurality of multipliers, the kernel data by convolution coefficients; and calculating, by the adder, a sum of multiplication results from the multiplying the kernel data by the convolution coefficient.

13. The method of claim 12, wherein the kernel comprises a plurality of kernels, and the extracting comprises simultaneously extracting in parallel kernel data corresponding to each of the plurality of kernels.

14. The method of claim 13, wherein the multiplying comprises simultaneously multiplying in parallel the kernel data corresponding to each of the plurality of kernels by the convolution coefficients.

15. The method of claim 13, wherein the calculating comprises calculating a sum of the multiplication results for each of the plurality of kernels and outputting a convolution result value for each of the plurality of kernels.

16. The method of claim 13, wherein the extracting comprises:

forming a first electrical connection to a buffer corresponding to the kernel of the input buffer and receiving the kernel data corresponding to the kernel; and forming a second electrical connection to the plurality of multipliers and transferring the kernel data to the plurality of multipliers.

17. A hardware processor comprising:

an input buffer configured to receive data and store the data;

a data extractor configured to simultaneously extract in parallel first kernel data comprising a plurality of data elements corresponding to a first kernel and second kernel data comprising a plurality of data elements corresponding to a second kernel from the data stored in the input buffer;

a plurality of multipliers configured to simultaneously multiply in parallel the first kernel data by first convolution coefficients, and the second kernel data by second convolution coefficients; and an adder configured to calculate a first sum of the multiplication results for the first kernel and a second sum of multiplication results for the second kernel, and output the first sum and the second sum, wherein the data extractor comprises a matrix switch configured to form electrical connections to the input buffer, to the multiplier, and to the adder based on the first kernel and the second kernel.

18. The hardware processor of claim 17, wherein the hardware processor does not store an intermediate calculation result.

* * * * *